United States Patent [19]
Durr

[11] 3,774,941
[45] Nov. 27, 1973

[54] TRAILER ANTI-JACKKNIFE DEVICE
[75] Inventor: Henry H. Durr, Papillion, Nebr.
[73] Assignee: Philip L. Haller, Omaha, Nebr.; a part interest
[22] Filed: Feb. 14, 1972
[21] Appl. No.: 226,133

[52] U.S. Cl. ............................................. 280/432
[51] Int. Cl. .......................................... B62d 53/06
[58] Field of Search .............................. 280/432

[56] References Cited
UNITED STATES PATENTS

| | | | |
|---|---|---|---|
| 3,063,739 | 11/1962 | Davies | 280/432 |
| 2,073,269 | 3/1937 | Skibbe | 280/432 |
| 2,468,705 | 4/1949 | Price | 280/432 |

FOREIGN PATENTS OR APPLICATIONS

| 797,701 | 10/1968 | Canada | 280/432 |
|---|---|---|---|

*Primary Examiner*—Kenneth H. Betts
*Assistant Examiner*—J. D. Rubenstein
*Attorney*—Zarley, McKee & Thomte

[57] ABSTRACT

An anti-jackknife device for a tractor semi-trailer combination is disclosed herein. The tractor has a conventional fifth wheel mounted at the rearward end thereof and the trailer has a kingpin extending downwardly from the lower forward end thereof for detachable connection with the fifth wheel. A plurality of disc brake assemblies are secured to the underside of the fifth wheel and rotatably support a brake disc therein. A hub means is secured to the brake disc and has a pair of opposing locking arms pivotally secured thereto which are movable into locking engagement with recesses in the underside of the trailer. A pneumatic cylinder means is connected to the locking arms for moving the arms between locked and unlocked positions with respect to the trailer. The disc brake assemblies are operatively connected to the tractor brake system so that actuation of the tractor brakes causes the disc brake assemblies to frictionally engage the brake disc to prevent rotation of the same with respect to the fifth wheel which prevents further angular displacement of the trailer with respect to the tractor. An air-hydraulic booster system is operatively connected to the disc brake assemblies to provide the necessary pressure thereto.

5 Claims, 7 Drawing Figures

TRAILER ANTI-JACKKNIFE DEVICE

In the problems of the trucking industry, the "jackknife" condition of a truck or tractor with the semi-trailer describes the inadvertent misalignment of the combination vehicle in the horizontal plane which is normally brought on by improper application of the brakes while moving at some substantial speed. The jackknife condition frequently leads to a disastrous loss of control of the vehicle. Normal straight line stops are made at relatively lower rates of deceleration which minimizes the jackknife phenomena.

It is impractical to assume that an anti-jackknife device can withstand the maximum forces involved in an unmanageable situation where the tractor is in a full broadslide. On dry pavement, for instance, if the front axle load is 10,000 lb. and is located about 150 inches ahead of the vertical axis of the fifth-wheel trailer hitch, a moment or torque in the horizontal plane on the order of 1,500,000 lb-in can be produced at the hitch center. Even if a hitch could be made to withstand that burden, the hitch supporting structure of the tractor frame could not absorb this imposed load without serious damage and further uncontrollable gyrations.

If an anti-jackknife mechanism could be made to limit any increase in misalignment and to also absorb without damage all forces resulting from a truck-trailer misalignment of, say, up to five degrees, it is apparent to experienced drivers and engineers that the majority of jackknife incidents would be eliminated. It is not unreasonable to estimate that this statistical group might include 90 percent or more of the occurrences possible.

A certain number of jackknife incidents occur in sharp turns at speeds excessive for the safe application of brakes. Accidents in this group are relatively few statistically, and are better reduced by improved and safer driving habits than any device such as is under consideration here.

Manifestly, the majority of jackknife incidents start with the tractor-trailer misalignment angle being negligible or very small, most likely less than five degrees. Further, the vast majority of these incidents depend upon the improper application of brakes to provide the disturbing forces to initiate the jackknife gyration, which in combination with sufficient speed, quickly progresses into catastrophic unmanageability in spite of the best effort of an experienced driver to counteract it.

From the foregoing, it is apparent that the most desirable anti-jackknife device combines the elements of simplicity, operating practicality, reliability, low cost and light weight construction.

Therefore, it is a principal object of this invention to provide an improved anti-jackknife device.

A further object of this invention is to provide an anti-jackknife device for a tractor semi-trailer combination.

A further object of this invention is to provide an anti-jackknife device which prevents further angular displacement of the trailer with respect to the tractor when the tractor brakes are activated.

A further object of this invention is to provide an anti-jackknife device for a tractor semi-trailer combination which is reliable in use.

A further object of this invention is to provide an anti-jackknife device for a tractor semi-trailer combination which provides the necessary maneuverability for the combination.

A further object of this invention is to provide an anti-jackknife device for a tractor semi-trailer combination which is easily mounted on the conventional fifth wheel of the tractor in an economical manner.

A further object of this invention is to provide an anti-jackknife device which does not interfere with the normal operation of the combination.

A further object of this invention is to provide an anti-jackknife device which requires only a very simple and economical modification to existing semi-trailers now in use.

A further object of this invention is to provide an anti-jackknife device which requires only seconds additional time for connecting and disconnecting tractor and semi-trailer.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

Figure 6:
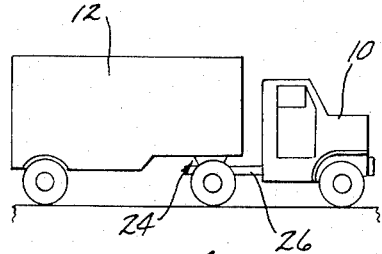
FIG. 6 is a perspective view of a tractor semi-trailer combination.
Figure 7:
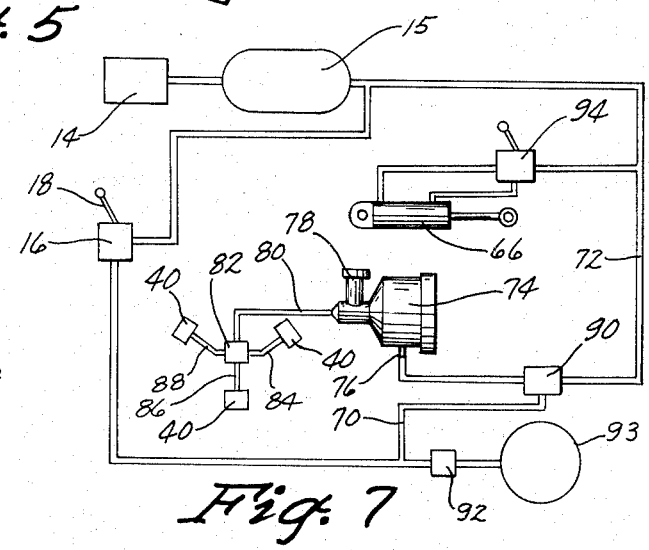
FIG. 7 is a schematic diagram of the pneumatic circuitry of the invention.

In FIG. 6, the numeral 10 generally refers to a conventional truck or the tractor adapted to pull a conventional trailer 12. The tractor 10 includes a conventional air compressor 14 and reservoir means 15 which is connected to a control valve 16 as illustrated in FIG. 7. The numeral 18 refers to the brake pedal in the tractor adapted to operate the modulating type valve 16 when depressed so that air is supplied to the tractor rear axle air brake chambers 92. When air is thus supplied to the brake chambers 92, it is simultaneously supplied to relay valve 90, which may be adjusted or regulated to function at approximately 10 to 25 P.S.I. brake chamber pressure as desired. In reacting to this pressure, the relay valve sends full system air pressure to the booster 74 energizing the disc brake assemblies 40

In releasing the braking air pressure in brake chambers 92, booster pressure is also released and the disc 48 is once again free to turn in the disc brake assemblies 40. Thus far, all the structure described in conventional in nature and will not be described in detail.

Figure 1:
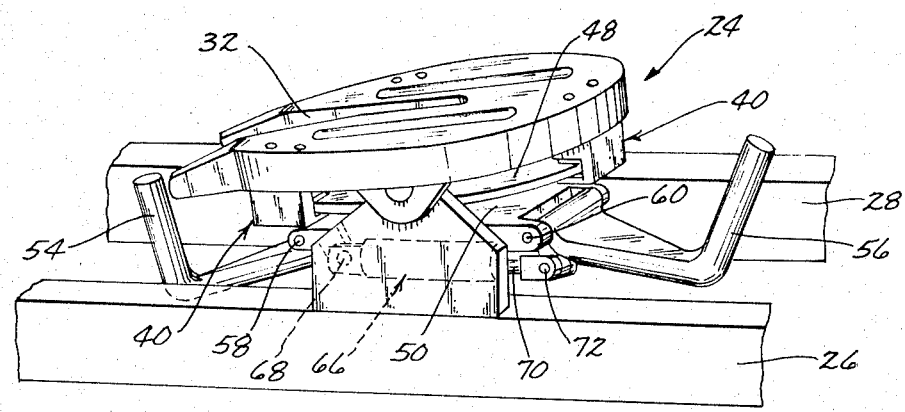
FIG. 1 is a perspective view of a conventional fifth wheel having the device of this invention mounted thereon.

The numeral 24 refers generally to a conventional fifth wheel which is pivotally secured to the tractor frame members 26 and 28 in conventional fashion as illustrated in FIG. 1. There are many types of fifth wheel assemblies and the locking mechanisms on the fifth wheels vary from one model to another so that details of the kingpin locking arrangement will not be shown for purposes of conciseness. The numeral 30 (FIG. 3) refers to a kingpin which extends downwardly from the lower forward end of the trailer 12 in conventional fashion and which is received by the locking slot 32 (FIG. 2) formed in the fifth wheel 24. The numeral 34 refers to a conventional wear plate which is positioned on the lower forward end of the trailer 12 and which rests upon the upper surface of the fifth wheel 24. The only departure from conventional structure heretofore is the provision of the pair of recesses 36 and 38 which are provided in the trailer wear plate 34 as illustrated in FIG. 3.

Figure 2:
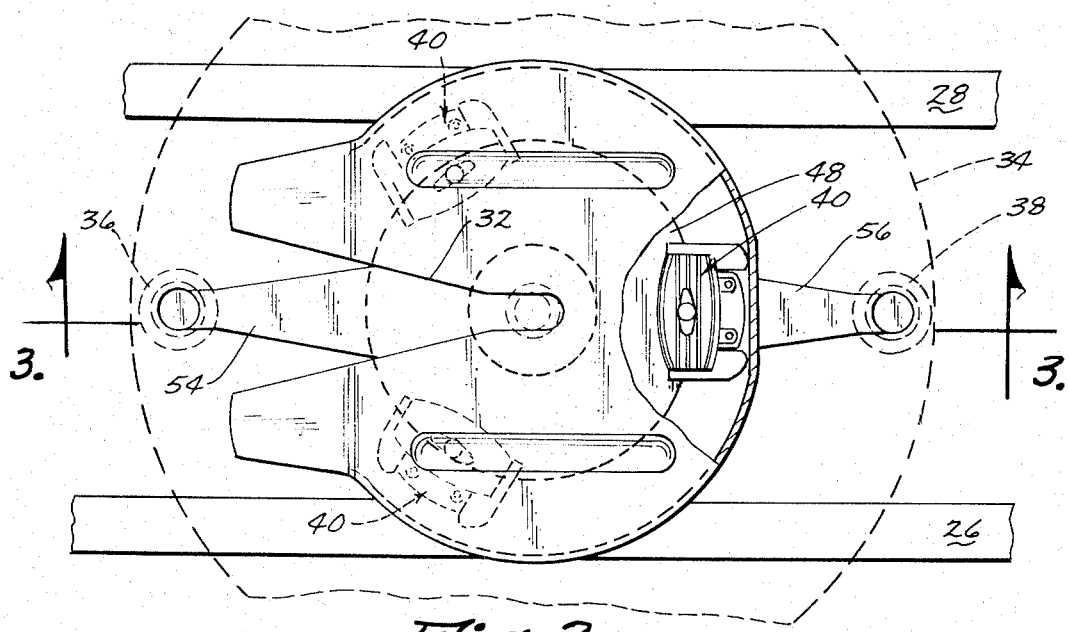
FIG. 2 is a top elevational view of the fifth-wheel illustrated in FIG. 1.
Figure 3:
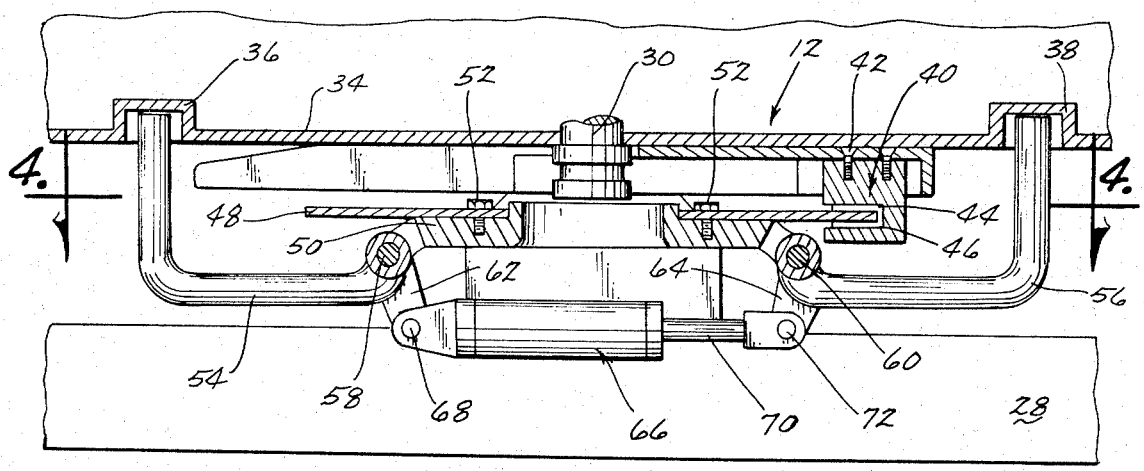
FIG. 3 is a sectional view seen along lines 3—3 of FIG. 2.
Figure 4:
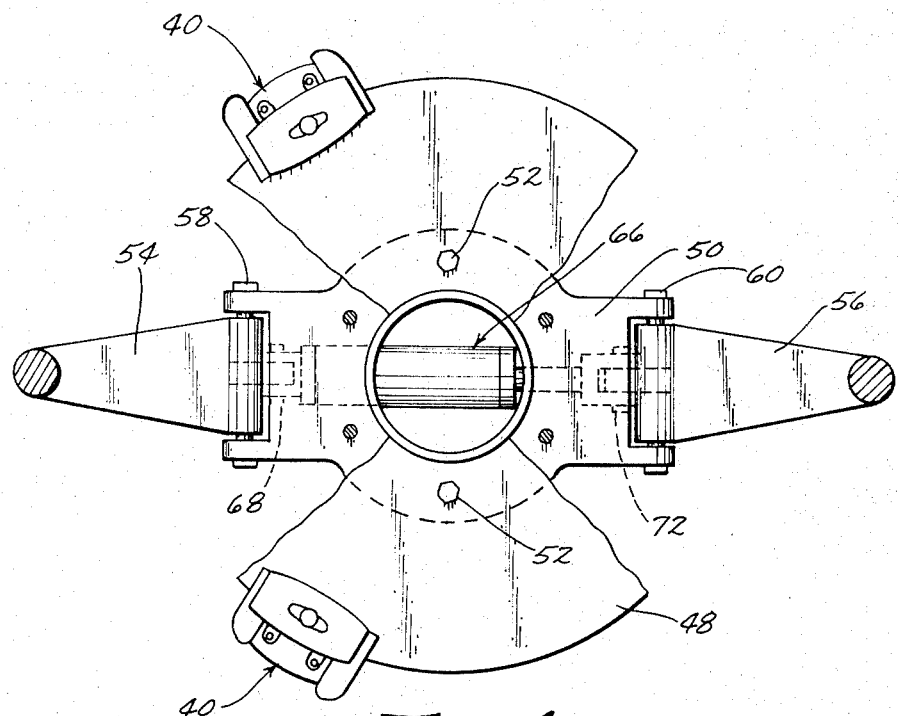
FIG. 4 is a sectional view seen along lines 4—4 of FIG. 3.

A plurality of conventional disc brake assemblies 40 are fastened below the fifth wheel 24 as illustrated in FIGS. 2 and 3 and are secured thereto by any convenient means such as bolts 42 or the like. Any number of disc brake assemblies may be employed but the preferable number is three as illustrated in the drawings. As stated, the disc brake assemblies are conventional in nature and a suitable type of disc brake assembly is the 2500 H series currently manufactured by H-H Products Division, Kelsey-Hayes Company, 5800 W. Donges Bay Rd., Mequon, Wisconsin 53092. Each of the disc brake assem-blies 40 comprise a pair of friction pads 44 and 46 which are adapted to be moved towards each other by the hydraulic piston within the assembly 40. This particular disc brake assembly has a fixed lower pad; the upper pad is moved by a 4 inch diameter piston behind it.

The numeral 48 refers to a brake disc which is supported by the disc brake assemblies 40 as illustrated in FIGS. 2 and 3. The periphery of the brake disc 48 is received between the friction pads on each of the disc brake assemblies 40 and is rotatable with respect thereto until such time as the hydraulic cylinders within the disc brake assemblíes 40 are actuated to cause the friction pads 44 and 46 to frictionally clamp the periphery of the brake disc.

A hub 50 is secured to the brake disc 48 by bolts 52. A pair of locking arms 54 and 56 are pivotally secured at their inner ends to opposite ends of the hub 50 by pins 58 and 60 respectively. As seen in FIG. 3, the locking arms 54 and 56 extend outwardly from the pins 58 and 60 respectively beneath the fifth wheel 24 and have upper or outer portions which are received by the recesses 36 and 38 respectively. Ears 62 and 64 are secured to the locking arms 54 and 56 respectively as shown in FIG. 3. The numeral 66 refers to a double acting pneumatic cylinder which is pivotally connected at one end thereof to the ear 62 by pin 68. The rod 70 of the cylinder 66 is pivotally connected to the ear 64 by means of pin 72. The cylinder 66 is connected to a suitable air valve 94 which is connected to the tractor air pressure system so that extension of the rod 70 from the cylinder 66 causes the locking arms 54 and 56 to pivot upwardly so that the upper ends thereof lock into the recesses 36 and 38 and are held in place by rod 70 force. Retraction of the rod 70 into the cylinder 66 causes the locking arms 54 and 56 to move downwardly from their locked position with respect to the trailer.

Figure 5:
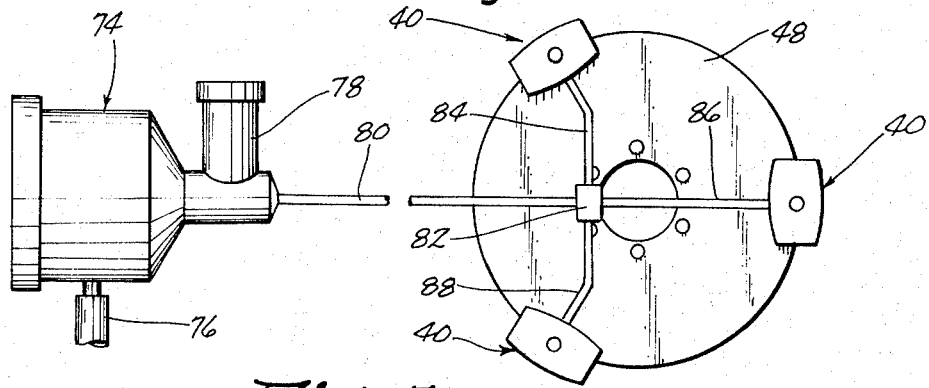
FIG. 5 is a schematic view illustrating the manner in which the disc brake assemblies are connected to an air-hydraulic booster unit.

In FIG. 5, the numeral 74 refers to a pressure booster unit having a hydraulic master cylinder with integral reservoir. The pressure booster unit 74 is connected to the relay valve 90 in the system by conduit 76. Ordinarily, conventional tractor air compressor systems will supply approximately 100 pounds per square inch air pressure to the pressure booster unit 74. The booster unit 74 is conventional in nature and would include a pneumatically controlled air piston therein which energizes the hydraulic piston so that hydraulic fluid is supplied from the hydraulic master cylinder 78 to the disc brake assemblies 40 by means of a flexible line 80, coupling 82 and lines 84, 86 and 88. Preferably, the pressure booster unit 74 would be mounted on the truck frame near the fifth wheel for convenience purposes. It is preferred that the pressure booster unit 74 be adapted to boost the pressure from 100 pounds per square inch to approximately 2,000 pounds per square inch hydraulic pressure so that the disc brake assemblies 40 will receive sufficient hydraulic pressure. FIG. 7 illustrates one means by which the disc brake assemblies 40 can be actuated. When the brake pedal 18 is depressed to actuate the truck rear axle brakes 93, relay valve 90 and thus the booster unit 74 are actuated to supply hydraulic pressure to the disc brake assemblies 40. Relay valve 90 is adjustable and is connnected to the main compressed air supply of the truck by conduit 72, and to the brake chamber air by conduit 70. Relay valve 90 when actuated by brake chamber air pressure (10 to 25 P.S.I.) admits full air pressure (100–125 P.S.I.) to booster 74.

In operation, the pneumatic cylinder 66 would normally be in a retracted position during those times that the trailer 12 is disconnected from the tractor 10 which would cause the locking arms 54 and 56 to be in their lowered position as illustrated in FIG. 1. When it is desired to use the trailer 12, the tractor 10 is simply connected thereto in conventional fashion so that the kingpin 30 is received in the locking slot 32. The conventional locking mechanism would then be actuated to positively lock the kingpin 30 in position. The tractor operator would then cause the tractor and trailer to be in general longitudinal alignment. The operator would then manually grasp one of the locking arms 54 or 56 and move the same into aligned position with respect to the recesses 36 and 38. The operator then actuates the pneumatic cylinder 66 by means of the dash mounted control relay valve 94 which causes the locking arms to move upwardly into the recesses 36 and 38. Thus, as the tractor moves over the road, any angular displacement of the trailer 12 with respect to the tractor 10 causes the hub 50 and brake disc 48 to rotate with respect to the fifth wheel since the recesses 36 and 38 cause the locking arms to move therewith. If the operator is required to make a rapid stop, the brake pedal 18 will be depressed to actuate the truck rear axle brakes. The depression of the brake pedal 18 can cause relay valve 90 to function which also causes the pressure booster unit 74 to supply hydraulic fluid under high pressure to the disc brake assemblies 40 thereby causing the friction pads thereon to frictionally engage the brake disc 48 to prevent rotational movement of the disc 48 with respect to the disc brake assemblies 40 and the fifth wheel 24. Thus, during braking operations, a rigid connection is provided between the trailer 12 and the tractor 10 through the locking arms, hub, brake disc, disc assemblies and the fifth wheel. The frictional engagement of the brake disc assemblies 40 on the brake disc 48 prevents further angular displacement of the trailer with respect to the tractor thereby preventing jackknifing of the trailer.

A fifth wheel with the anti-jackknife device of this invention can be installed in place of most existing fifth wheel assemblies without extensive modification of the assembly. The anti-jackknife device disclosed herein is extremely reliable and extremely effective in operation. The device does not affect the normal operation of the tractor and trailer combination since the brake disc 48 is free to rotate in the brake disc assemblies 40 until such time as the brakes are actuated.

Another considerable advantage of the compact configuration of the invention is the relative ease of adapting to the design of the adjustable fore-and-aft positioning type of fifth wheel construction, called a "sliding fifth wheel" in the trade, in contrast to the "fixed" configuration illustrated.

Exotic components are no part of this invention, which is yet another considerable advantage in maintenance. This means no costly special training will be necessary for truck maintenance personnel.

The air-hydraulic booster 74 includes a relatively large area piston acted upon by system air pressure, which in turn pushes against a relatively smaller area piston pressurizing the hydraulic system. The pressure multiplication ratio is approximately the ratio of the piston areas, e.g., a 4½ inch diameter air piston has an area approximately 20 times a 1 inch diameter hydraulic piston (in master cylinder), thus the 100 P.S.I. air pressure may be multiplied or boosted to 2,000 P.S.I. hydraulic pressure.

While it is assured that this booster actuated disc brake adaptation has ample capacity to arrest all jackknifing up to the five degrees previously mentioned, it will further control increase of angular misalignment in most cases up to 15 degrees.

Thus it can be seen that the invention accomplishes at least all of its stated objectives.

I claim:
1. In combination,
   a truck having a fifth wheel means thereon,
   a trailer having a kingpin extending downwardly adjacent its forward end detachable connection to said fifth wheel means so that said truck can pull said trailer,
   said fifth wheel means having top and bottom portions, said top portion positioned closely adjacent the forward bottom area of said trailer,
   a plurality of disc brake assemblies secured to said fifth wheel means adjacent said bottom portion,
   a brake disc mounted in each of said disc brake assemblies and being supported thereby, said brake disc normally being freely rotatable with respect to said disc brake assemblies,
   a locking assembly rigidly secured to said brake disc, said locking assembly comprising an arm means movable between locked and unlocked positions,
   said arm means, when in its locked position, causing the brake disc to rotate with respect to said disc brake assemblies upon angular movement of said truck with respect to said trailer if said disc brake assemblies are not actuated,
   said arm means, when in its locked position, substantially preventing angular displacement of said trailer with respect to said truck when said disc brake assemblies are actuated, the actuation of said disc brake assemblies causing said disc brake assemblies to frictionally engage said brake disc to prevent rotation of said brake disc with respect to said disc brake assemblies and said fifth wheel,
   said locking assembly comprising a hub means centrally secured to said brake disc, said arm means comprising first and second spaced apart locking arms pivotally connected to said hub means about horizontal axes, and a power cylinder means operatively connected to said locking arms for moving said locking arms into locking engagement with said trailer.

2. The combination of claim 1 wherein each of said locking arms have inner end portions which are positioned below said fifth wheel which extend outwardly from said hub means, each of said locking arms having outer end portions which extend upwardly from said inner end portions outwardly of said fifth wheel.

3. The combination of claim 1 wherein said truck has an air brake system, said disc brakes being hydraulically operated and being connected to a pressure booster assembly, said air brake system being connected to said pressure booster assembly to supply air under pressure thereto when the truck brakes are actuated, said pressure booster unit being adapted to respond to the air pressure supplied thereto and to actuate said hydraulically operated disc brake assemblies.

4. The combination of claim 1 wherein said trailer has a wear plate secured to its lower forward end, said wear plate having a recess formed therein for receiving said arm means.

5. In combination,
   a truck having a fifth wheel means thereon,
   a trailer having a kingpin extending downwardly adjacent its forward end for detachable connection to said fifth wheel means so that said truck can pull said trailer,
   said fifth wheel means having top and bottom portions, said top portion positioned closely adjacent the forward bottom area of said trailer,
   a locking arm means operatively rotatably mounted on said fifth wheel means, said locking arm means being pivotally movable from locked to unlocked positions,
   a brake means operatively interconnecting said fifth wheel means and said locking arm means for selectively preventing the rotation of said locking arm means with respect to said fifth wheel when said brake means is activated,
   said locking arm means engaging said trailer to prevent jackknifing from occurring when said brake means is activated.

* * * * *